Hinman, Thatcher & Palmer,
Cutting Shingles,
No. 1,109.          Patented Mar. 25, 1839.

UNITED STATES PATENT OFFICE.

J. HINMAN, J. THATCHER, AND ALONZO PALMER, OF PERSIA, NEW YORK.

MACHINE FOR CUTTING SHINGLES.

Specification of Letters Patent No. 1,109, dated March 25, 1839.

*To all whom it may concern:*

Be it known that we, JUSTUS HINMAN, JOHN THATCHER, and ALONZO PALMER, all of the town of Persia, in the county of Cattaraugus and State of New York, have invented a new and useful Improvement in Machinery for Manufacturing Shingles, and that the following is a full and exact description thereof, reference being had to the annexed drawings of the same, making part of this specification.

The nature of our invention consists in making shingles from timber in its natural state by cutting them longitudinally from the bolts or blocks, of the requisite length for the shingles, by a reciprocating knife placed obliquely or at right angles with the slide or carriage to which it is attached, operating parallel, or nearly so, with the grain of timber, according to the angle of the knife.

In the accompanying drawings the same letters of reference are used to designate the same parts of the machine in each of the different figures.

Figure 1:
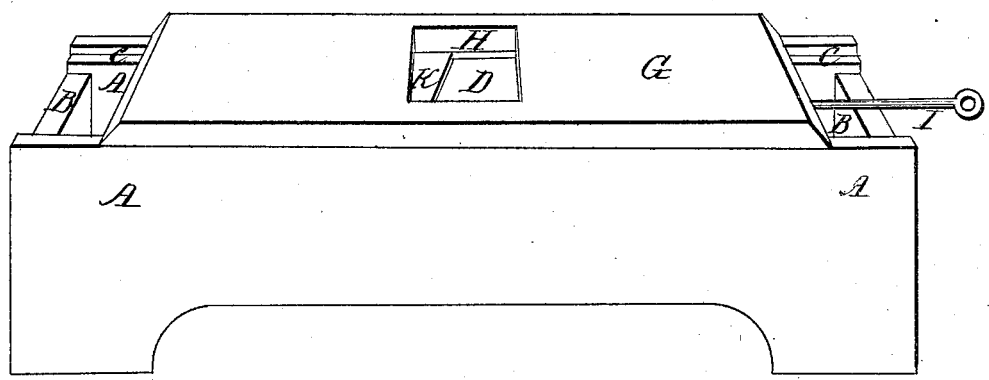
Figure 2:
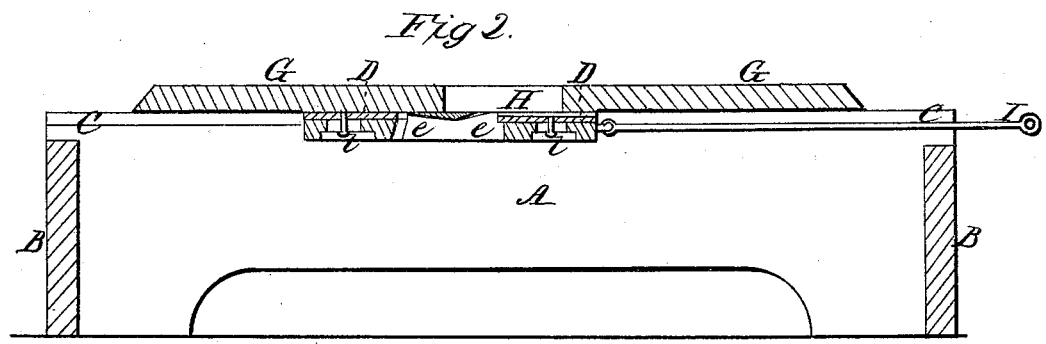
Figure 3:
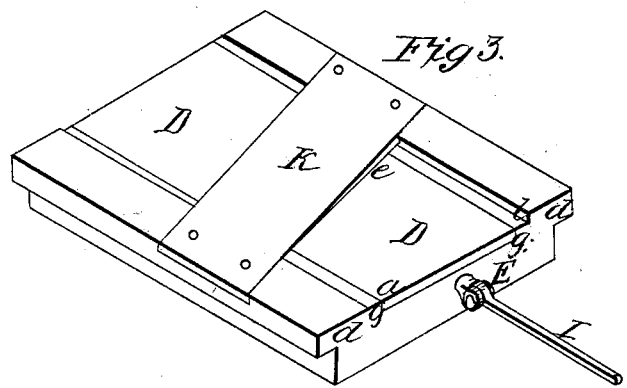

Figure 1 represents a perspective view of the machine; Fig. 2, a longitudinal section through the center of the machine, carriage, and knife. Fig. 3 represents an enlarged perspective view of the carriage and its appendages.

A, Figs. 1 and 2, represent the sides of the frame, formed of plank or timber, of a width equal to the required height of the machine. A recess is formed in the under edges of these planks or timbers by cutting them away, a sufficient length and width to admit of the shingles being removed from beneath and leaving the ends to support the machine. Transverse pieces B, Figs. 1 and 2, are framed or firmly secured to the sides of the frame by bolts or otherwise and of nearly the same height of the sides and a little longer than the shingle required to be cut. At the top of the side pieces A, Figs. 1 and 2, on the inner edge, an open top groove or rabbet $c$ is formed at right angles with the top and sides, of sufficient size to receive the flange or projection $d$, Fig. 3, of the carriage E, which moves therein. Above and attached to the top of the frame is a plank or timber G, Figs. 1 and 2, of the same width and nearly equal in length, through the center of which is formed a transverse opening or aperture H, Figs. 1 and 2, and in length and breadth equal to the size of the shingles to be cut. In this aperture are placed the bolts or blocks from which the shingles are to be cut. This cover or top G, Figs. 1 and 2, forms the upper side of the open groove or rabbet in the sides and secures the carriage E, Fig. 2, firmly within the frame of the machine. The carriage or table is in form a parallelepiped, as shown at Fig. 3. A pitman I Figs. 1, 2, and 3, is attached to one end of the carriage, to which the motive power is applied, and the knife K, Figs. 1, 2, 3, passes alternately from one side of the hopper or aperture H to the other. The knife K, Figs. 2 and 3, is secured to the opposite edges of the carriage by screws or in any other convenient and applicable manner, as seen at Fig. 3, and its upper surface is on a plane with the top of the carriage and about ten inches in width or such other width as is best adapted to the performance of the machine. The cutting portion, which lies within the flanges $d$, is triangular, having two very acute angles at the edges and a corresponding obtuse angle at the center of the under side, as at Fig. 2. The acuteness of the angles is such that when the knife is passing through the bolt the timber possesses elastic or bending properties sufficient to correspond to the angle and for the knife to cut the shingle from the bolt without cracking its grain or fibers. The edges of this knife being so acute, it must necessarily be made of considerable width to obtain such thickness at the center as will give it the requisite strength. The knife is placed obliquely in the carriage for the purpose of allowing the cutting operation to commence gradually by one end of the knife entering in advance of the other portion, and thus avoiding the concussion that would be produced by bringing the whole length of the knife in contact with the bolt simultaneously. Through this carriage there is formed, a throat $e$, Fig. 2, at the top, and directly beneath the cutting portion of the knife it is increased in length by sloping the ends from the knife for the purpose of allowing free egress to the shingles as they fall through the machine. On each side of the knife and between the flanges is formed a movable platform D, Figs. 1, 2 and 3, on one end of which the bolt is placed prior to the commencement of the cutting operation. These platforms are depressed below the plane of the flanges and knife equal to the thickness of the shingles to be cut. The depression at the opposite sides of the platform is not the same, but in accordance with the thickness of the apex and base of the shingle, as shown at Fig. 3. *a* represents the side at which the apex or point of the shingle is cut, and *b* the base or butt. The sides of the platforms are reversed at opposite sides of the knife, bringing a large and small depression, of the two platforms at the same side of the carriage, on opposite sides of the knife. By this arrangement the shingles are cut a butt and a top alternately from the same end of the bolt. Thus every two shingles take a piece uniform in thickness throughout from the bottom of the bolt. These platforms D, Figs. 2 and 3, are formed in separate pieces and secured to the carriage by being inserted within projecting flanges or dovetails *g*, Fig. 3, and secured by bolts or set screws *i* passing through the carriage or table into the platform. The opening or slot is formed through the table of the same width as the size of the bolt and a few inches long to admit of the platforms being moved either to or from the knife, to adjust it to the best working position. At the lower edge of this slot a recess is formed around it to receive the head of the bolt within the table or carriage, as shown at Fig. 2. At the upper edges of the platform or table projecting flanges *d* are formed of sufficient size to correspond with the grooves *c* by cutting away a part of the under edge or attaching them to the outer edge, as shown at Fig. 3. These platforms are arranged in separate pieces for greater convenience in repairing the machine and for altering the thickness, or taper of the shingles as occasion may require. This carriage is of sufficient thickness to give the necessary solidity and stiffness to act upon the bolt without trembling.

In the operation the bolt is placed within the hopper H at the top of the frame, upon one of the platforms. As the carriage is put in motion the knife is brought in contact with one edge of the bolt, on a line with the required thickness and taper of the shingle, and as the carriage advances the shingle passes out beneath at the throat and the bolt passes over the knife to the opposite platform. The motion of the carriage is then reversed and the opposite edge of the knife is brought in contact with the opposite edge of the bolt and the same operation performed as before, and the carriage thus interchangingly passes from one side of the hopper or opening to the other, cutting a shingle from the bolt at each successive movement.

Having described the construction and operation of the machine, we now proceed to point out those parts which are new and of our own invention.

We do not make any claim to the construction of the frame nor intend to confine ourselves to any exact form or size, but to vary the same while the principles remain unchanged; but We do claim—

The carriage or table constructed with two movable platforms D at the upper side placed at opposite ends, with their sides *a* and *b* depressed so much as to give the requisite thickness and taper to the shingles, and the opposite platforms having their opposite sides reversed; in combination with the two edged knife, the same being constructed and combined substantially in the manner, and for the purposes herein set forth and described.

JUSTUS HINMAN.
JOHN THATCHER.
ALONZO PALMER.

Witnesses:
A. H. HURD,
D. F. LELAND.